United States Patent [19]

Schroeder, Jr.

[11] Patent Number: 4,510,397
[45] Date of Patent: Apr. 9, 1985

[54] POLYMER FLOW CONTROL APPARATUS

[75] Inventor: Donald E. Schroeder, Jr., Littleton, Colo.

[73] Assignee: Marathon Oil Company, Findlay, Ohio

[21] Appl. No.: 515,407

[22] Filed: Jul. 20, 1983

[51] Int. Cl.³ ............................ F03B 13/00; H02K 7/18
[52] U.S. Cl. ............................................. 290/43; 290/52; 290/53; 290/54; 290/42; 422/62
[58] Field of Search .................. 290/52, 53, 54, 55, 290/43, 42, 2, 4; 422/62

[56] References Cited

U.S. PATENT DOCUMENTS

| | | | |
|---|---|---|---|
| 3,034,526 | 5/1962 | Roselle | 137/1 |
| 3,128,794 | 4/1964 | Boucher et al. | 138/37 |
| 3,517,208 | 6/1970 | Williams et al. | 290/52 X |
| 3,773,429 | 11/1973 | Hayward | 290/52 X |
| 3,776,279 | 12/1973 | O'Connor, Jr. | 290/55 X |
| 3,945,402 | 3/1976 | Murphy | 138/37 |
| 4,134,024 | 1/1979 | Wiseman | 290/54 X |
| 4,369,373 | 1/1983 | Wiseman | 290/54 X |
| 4,408,127 | 10/1983 | Santos, Sr. | 290/54 |
| 4,443,707 | 4/1984 | Scieri et al. | 290/54 X |

Primary Examiner—Stanley J. Witkowski
Assistant Examiner—Paul Shik Luen Ip
Attorney, Agent, or Firm—Jack L. Hummel

[57] ABSTRACT

Flow control of diluted polymer solutions is effected by utilizing positive-displacement flow devices such as gear pumps to withdraw flow energy in the form of shaft work. Control is obtained by varying the nature and amount of shaft work withdrawn, such as by operation of an electrical generating system, and the work so created may be used to provide operating power to a control system.

7 Claims, 3 Drawing Figures

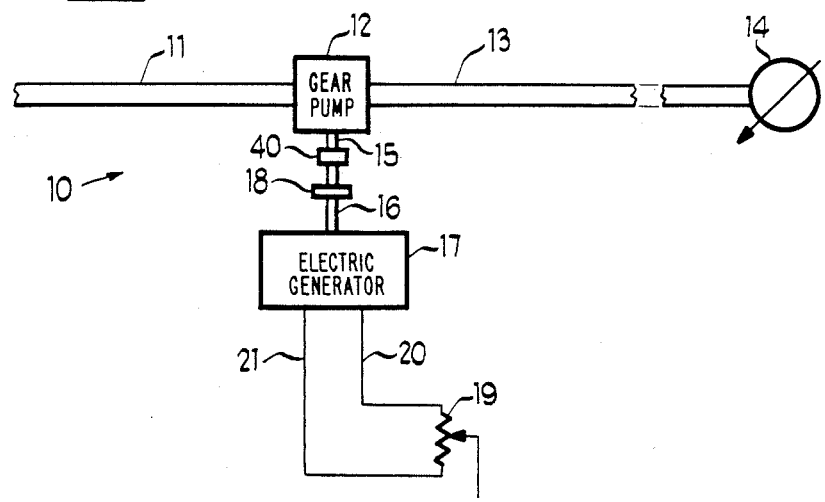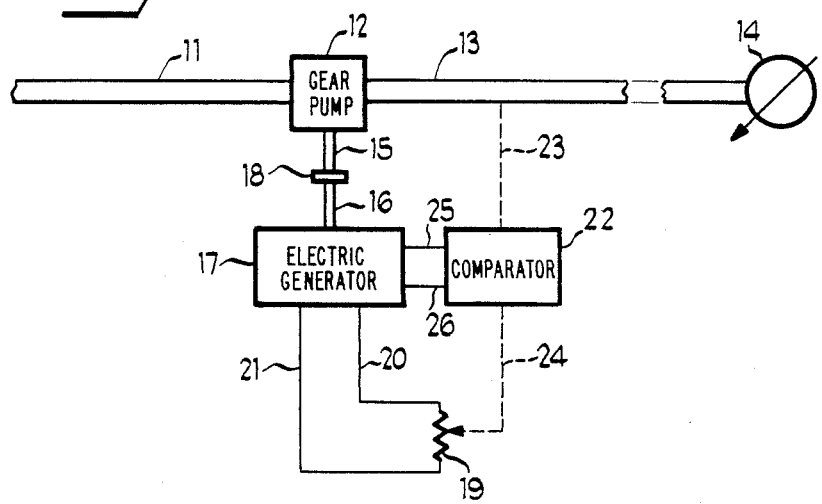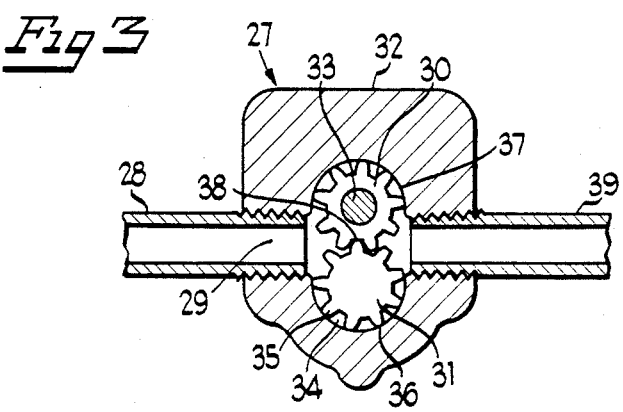

4,510,397

1

POLYMER FLOW CONTROL APPARATUS

TECHNICAL FIELD

The present invention relates to apparatus for controlling the flow of polymer solutions while minimizing degradation of the polymer and, in particular, to apparatus utilizable for the on-site flow control of diluted solutions of a partially hydrolyzed polyacrylamide for use in the secondary and tertiary recovery of oil from subterranean rock formations.

BACKGROUND OF THE PRIOR ART

Use of aqueous solutions of polymers such as a partially hydrolyzed polyacrylamide (PHPA) to recover residual oil from oil-bearing subterranean rock formations is well known. In secondary recovery operations, after normal drilling and pumping operations, the subterranean rock formation is flooded through an input well with a polymer solution and the resulting admixture of polymer solution and oil is forced to an output well head where it is pumped from the ground. In tertiary operations, recovery of residual oil is first accomplished by flooding the rock formation with water and, thereafter, flooding with a polymer solution.

Through extensive research in the use of polymer solutions in secondary and tertiary oil recovery operations, it has been discovered that a polymer solution can be tailor-made, so to speak, to meet the performance demands of substantially any oil-bearing subterranean formation. More specifically in this connection, it has been found that such considerations as the average molecular weight and the molecular weight distribution properties of a polymer comprising the polymer solution can significantly augment and enhance oil recovery thereby resulting in important reductions in recovery costs.

In the case of solutions of PHPA, care must be taken in formulating, diluting, and handling the solutions in order to limit the breaking up or "degrading" of the polymer and thus to preserve to the greatest extent possible its preselected average molecular weight and molecular weight distribution properties. The on-site and on-demand production and use of PHPA accentuates the problem of polymer degradation.

Apparatus for the production and dilution of PHPA may be maintained on a continuous basis. The direction and control of flow of the aqueous PHPA as it is transported to the point of injection into an oil-bearing formation are critical in maintaining the integrity of the polymer. Mechanical stress, such as that induced by abrupt changes in flow direction, turbulent flow, and travel through partially closed valves or other flow control devices contribute to the degradation of the polymer solution, and adversely affect such properties as the polymer's mobility, injectivity, brine tolerance, and resistance to further thinning induced by shear forces.

The systems presently used to prepare and inject aqueous PHPA solutions for oil recovery purposes can be preassembled and mounted on skids, for example, for ready transport to and from a site where recovery is to take place. Such a system may include a monomer supply, a source of water, polymerization apparatus, catalyst feed and monitoring equipment, hydrolyzation apparatus including means for feeding a controlled amount of a hydrolyzing agent into the polymer stream, and apparatus for diluting the hydrolyzed polymer and injecting it into an input well penetrating a reservoir of interest.

A system of this type is capable of producing a broad spectrum of polymers of varying average molecular weight and molecular weight distribution to meet the permeability demands of substantially any oil-bearing formation being worked. Once the parameters are determined, the system can produce a polymer having the desired properties. The present invention, in one of its aspects, is intended to maintain the preselected characteristics of the polymer solution as the solution is moved through a system to the input well, while enabling the rate of solution flow to be properly controlled.

In the past, flow control expedients have included varying the length of pipe through which the polymer solution is transported or the use of sand packs. These techniques are unsatisfactory because they are cumbersome, and require much time and labor to effect flow changes.

Other prior art efforts involving the manufacture and transport of polymer solutions have not addressed the particular problems solved by the present invention.

U.S. Pat. No. 3,034,526, for example, describes a three-dimensional T-shaped cascade system intended to prevent the degrading of molten, highly viscous linear polymers such as nylon, but does not teach a simple and efficacious manner to vary polymer flow rates while avoiding degradation.

U.S. Pat. No. 3,128,794 describes apparatus for moving molten polymers through pipe lines and using inverters positioned in the flow path of the polymer to equalize residence time between the polymer flow segment at the outer periphery of the pipe line and the flow segment at the center of the pipe line. The patent merely teaches the diversion of polymer flowing along the conduit walls toward the conduit center, and vice versa, without controlling the rate of flow. A similar consideration, pipeline residence time, is addressed in U.S. Pat. No. 3,353,564, which uses a plurality of screens spaced apart one from the other and placed in the material flow path. The positioning of such screens is intended to prevent thermal degradation of the polymer by flattening the velocity profile of the polymer to equalize flow rates rather than to set flow rates.

U.S. Pat. No. 3,945,402 teaches a pipe system incorporating turbulence control apparatus which includes spaced-apart screens positioned within a tapered pipe run. The internal wall roughness of the '402 apparatus is selected to achieve laminar flow at Reynolds numbers in excess of 2200. Although use of valves and pumps in the system is described, no teaching is found concerning use of a system to control the transport of mechanically degradable polymer solutions.

BRIEF DESCRIPTION OF THE PRESENT INVENTION

In accordance with the present invention, apparatus is provided to control the flow of aqueous polymer solutions, such as PHPA, in a manner to effectively minimize polymer degradation. The apparatus employed allows for efficient and effective flow control without requiring time-consuming changes in pipeline length, or the use of inefficient sand packs. In addition, the apparatus finds particular application in on-site liquid transport systems which can be set up in the field, and easily moved or rearranged. The improved results in flow control moreover are achieved while simultaneously generating significant amounts of energy which can be utilized for automatically controlling the flow rate of the polymer stream, as well as for the energization of other equipment at the input well site.

To this end, the apparatus described herein employs positive-displacement fluid flow control means positioned strategically along the path of flow of the polymer solution. Examples of such flow control means are flow meters, such as oval gear meters, birotor meters, or oscillating piston meters, piston-type pumps, vane pumps, gear pumps, and hydraulic motors.

Flow control is obtained by varying the rate at which energy is removed from the polymer stream by the flow control means. Control of such energy removal can occur in many forms, such as by transforming the energy created by the polymer stream to a different form of energy. In accordance with one embodiment of the invention, an electrical generator, coupled to the flow control means, provides a field current or electrical load capable of varying the amount of work performed by the flow control means.

In accordance with another aspect of the invention, the energy output of the generator coupled to the flow-control means can be used as a source of power for an automatic control system. Controls may be provided to set a desired flow rate, to measure the actual flow rate, and to adjust the flow rate to approximate the set rate by varying the resistance of the flow control means. Any excess power from this arrangement can be utilized to energize a lighting system, for example, at the input well site.

Mechanical loads may also be coupled to the output of the flow control device, and thus used to absorb the work extracted from the flowing polymer stream.

The foregoing, and other features and advantages of the present invention will become more apparent upon consideration of the following description and the accompanying drawings.

BRIEF DESCRIPTION OF THE DRAWINGS

FIG. 1 is a schematic diagram of one embodiment of the present invention utilizing a gear pump as the flow control means and an electrical generator as a variable resistance device;

FIG. 2 is a schematic representation of another embodiment of the invention showing an automatic flow measurement and control system energized by a portion of the output of the generator; and FIG. 3 is a schematic representation of a gear pump of the type utilizable with the present invention.

DETAILED DESCRIPTION OF THE INVENTION

While the present invention finds utility in the flow control of various polymer solutions, generally, the embodiments shown and described herein have special utility for controlling the flow of aqueous solutions of PHPA in conjunction with secondary and tertiary oil-recovery procedures.

The on-site preparation of aqueous PHPA solutions involves the steps of polymerizing an acrylamide monomer in the presence of a suitable initiator or catalyst, preferably a co-mixture of ammonium persulfate and sodium bisulfite. After polymerization is complete, partial hydrolysis is carried out by adding to the polymer an amount of monovalent base, such as sodium hydroxide or potassium hydroxide, sufficient to hydrolyze about 20 to about 40 mole percent of the amide groups. Following hydrolyzation, the solution is diluted to about 1% or about 2% for temporary storage or for immediate injection into an input well. Careful regulation of the polymerization process produces aqueous PHPA solutions of predetermined properties which are matched to the performance demands of an oil-bearing formation of interest. Eventual transport to the well site for injection must then be accomplished in such a manner as to minimize any polymer degradation.

Referring now to FIG. 1 of the drawing, the numeral 10 indicates generally a schematic representation of one embodiment of a flow control system of the present invention. An aqueous polymer solution diluted as described hereinabove, to a concentration of about 1–2%, flows through polymer stream inlet 11 to a hydraulic gear pump 12, and thence to polymer stream outlet 13. Thereafter, the polymer stream is directed to a well head 14 for injection into an oil-bearing reservoir.

Gear pump 12 may be of the type having two or more meshing gears, and is designed to be actuated by the passage of fluid therethrough. Other hydraulic motors, such as those of the piston type, or vane type, may also be employed. An important consideration is to have the internal structure and geometry of the pump such that passage therethrough of the PHPA solution does not induce polymer degradation.

In order to control the rate of flow of the polymer solution, and to effect a pressure drop across the pump 12, means are provided to extract energy from the polymer stream as it passes through pump 12. In more conventional flow systems, flow control is accomplished through use of control valves, the closing of which presents progressively increased physical resistance. Such techniques are not suited for use with polymer solutions of the type and for the use hereinabove described, because such resistance can result in excessive degradation of the polymer.

As shown in FIG. 1, the output shaft 15 of gear pump 12 is coupled to a drive shaft 16 of an electrical generator 17 by a coupling 18. A flywheel 40 desirably may be positioned between the pump 12 and the generator 17 to store mechanical energy. This will help maintain a steady speed and flow rates. The electrical output of the generator 17 may be absorbed by a selectively variable load depicted at 19 via transmission lines 20 and 21. Load 19 may, of course, take whatever form is most useful, given the character of the output of the generator 17, and may even be used to power an automatic control system of the type described hereinbelow, to operate electric lights, to recharge electrical equipment, or to perform other useful applications.

In FIG. 2, the embodiment of the present invention illustrated incorporates an automatic flow measurement and control system powered by a portion of the output of generator 17.

A comparator 22 is provided to receive flow rate data via a detector connection 23 which, in turn, is connected to a flow detector capable of providing an electrical signal which varies as the rate of flow varies. As an example, a magnetic pickup may be mounted to pump 12 to measure rpm, and the resulting output converted to an electrical signal. Comparator 22 includes means to set a flow rate, or range of rates, to which the actual flow rate may be compared. When the actual flow rate varies sufficiently from the set value, comparator 22 will detect this difference, or "error", and will activate means to vary the resistance to rotation of generator 17. In the system shown in FIG. 2, means are provided to alter variable resistance 19 responsive to an electrical signal transmitted via a control line 24. Another means for accomplishing this result would be to vary the field current responsive to the error detected by the comparator 22.

The above-described control system is powered by a portion of the electrical output of the generator 17 via power lines 25 and 26. It should be understood that well-known expedients may readily be interposed between generator 17 and comparator 22 to ensure that the resulting voltage is in a form appropriate for use by the comparator 22. A backup source of electrical power may also be employed should the output of generator 17 fall to a level wherein comparator 22 cannot operate.

Generator 17 may also power alternative control systems, such as those powered by compressed air, by providing the power to operate a compressor which, in turn, provides power for compressed-air control devices. Use of such a hybrid system may be desirable where flammable process components are involved, calling for minimum use of electrical apparatus.

The above-described systems may be readily adapted for manual operation to allow adjustment of the flow rate by manual adjustment of load 19.

Referring now to FIG. 3, there is depicted a schematic representation of a hydraulic gear pump 27 found suitable for use with the present invention. Incoming PHPA solution is directed to inlet 28, and enters pump inlet chamber 29. Upper gear 30 and lower gear 31 are rotatably mounted within pump housing 32, with upper gear 30 keyed to output shaft 33.

In the embodiment depicted, upper gear 30 rotates in a clockwise direction, while lower gear 31 moves in a counter clockwise direction when contacted by incoming polymer solution. Individual increments or "bites" of solution are trapped between adjacent gear teeth, as in space 34 between teeth 35 and 36, and are carried along as said teeth are "wiped" along the inner periphery of pump housing 32. As the solution reaches pump outlet chamber 37, the meshing of gears 30 and 31, at 36, forces the solution to outlet 39. Rotation of shaft 33 provides motive force for the generator 17.

Exemplary of a pump which can be used effectively as part of the present invention is a fixed-displacement hydraulic gear pump manufactured by the Viking Pump Division of Houdaille Industries, Cedar Falls, Iowa, under the model designation GP-0514 and having a capacity measured at 3.22 gallons/minute at 1,000 rpm.

By way of illustrating the power generating capabilities of the flow control system of the present invention, the mechanical energy balance of the pumping process is:

dWs=VdP-dF where
Ws=shaft work realized
V=Volume
P=Pressure
F=Friction work

If it is assumed that friction losses are negligible, then the foregoing equation reduces to:

$$Ws = 6.9 \times 10^{-3} Q \Delta P = \text{watts}$$

where Q=BPD (barrels per day)
ΔP=psi

Assuming that a solution having a concentration of 1000 ppm of PHPA is available from a supply manifold at 600 psi, and it is desired to inject the solution into an input well at the rate of 100 BPD at 150 psi, the energy extracted by a system such as those illustrated in FIGS. 1 and 2 would be equivalent to 310 watts. This energy, as indicated, could be utilized to energize light bulbs, or the like. If the differential pressure, ΔP, changed for some reason, the light wattage could be changed to compensate in the following way:

| ΔP, psi | Ws, watts |
|---------|-----------|
| 100     | 69        |
| 200     | 138       |
| 300     | 207       |
| 400     | 276       |
| 500     | 345       |

It should be understood that the substantial drops in pressure across the gear pump, and the concomitant extraction of appreciable energy, are achieved with no, or minimal, polymer degradation.

Where additional degrees of control are required, more than one positive-displacement flow element, such as gear pump 12, may be used in flow lines carrying diluted polymer solutions.

It should also be understood that variations in concentration in the aqueous PHPA solution, and external factors such as ambient temperature, may affect the limits to which flow resistance may be applied without causing an undue amount of polymer degradation. Use of the before-described apparatus may be varied to take such factors into account, and it may be more efficacious under such circumstances to utilize several such flow devices simultaneously, rather than a single device.

While the foregoing description has presented specific aspects of preferred embodiments of the present invention, it is to be understood that these embodiments have been presented by way of illustration only and not by way of limitation. It is expected that others skilled in the art will perceive differences which, while varying from the foregoing, do not depart from the spirit and scope of the invention as herein described and claimed.

I claim:

1. A system for controlling the flow of a stream of a dilute aqueous solution of a partially hydrolyzed polyacrylamide through conduit means across which a pressure drop occurs in a manner to prevent or substantially minimize degradation of the polyacrylamide prior to injection of the solution into an input well of an oil-bearing formation, comprising, in combination, a hydraulic gear pump positioned in conduit means upstream from the input well of an oil-bearing formation and across which a pressure drop in a dilute aqueous solution of a partially hydrolyzed polyacrylamide occurs, said gear pump having an inlet and an outlet and fluid driven gear means; a drive shaft associated with the gear means of the pump; a generator in communication with said drive shaft; selectively variable load means in communication with the generator; a comparator in communication with the generator, said comparator being provided with flow rate regulating means; flow rate detector means in communication with the comparator and the fluid stream at the outlet of the gear pump; electrical signal transmitting means in communication with the comparator and the variable load means for varying the resistance of the generator to the rotation of the drive shaft associated with the gear means of the gear pump whereby the flow rate of the aqueous solution of partially hydrolyzed polyacrylamide across the gear pump will be such as to prevent, or substantially minimize degradation of the partially hydrolyzed polyacrylamide.

2. A system according to claim 1 wherein the comparator includes means to set a flow rate to which the actual flow rate of the aqueous solution of partially hydrolyzed polyacrylamide across the gear pump can be compared, and for changing said flow rate to a set value.

3. A method for controlling the flow of aqueous partially hydrolyzed polyacrylamide solutions of the type employed as drive fluids and/or mobility control agents in the recovery of oil from subterranean oil-bearing reservoirs to prevent shear degradation of the polyacrylamide prior to introducing the solution into an input well of an oil-bearing reservoir: comprising the steps of diluting the aqueous partially hydrolyzed polyacrylamide solution to provide a concentration of the partially hydrolyzed poplyacrylamide in the solution sufficient to enable the solution to substantially meet the permeability requirements of the oil-bearing reservoir; passing the diluted solution at one fluid pressure through flow control means to effect a lowering of the fluid pressure of the solution while at the same time extracting from the flow control means the mechanical energy resulting from the lowering of the fluid pressure of the solution; converting the mechanical energy extracted from the flow control means to electrical energy; and utilizing a portion at least of the electrical energy to regulate the rate at which the solution passes through the flow control means so as to minimize any shear degradation of the partially hydrolyzed polyacrylamide as it undergoes a change in fluid pressure.

4. A method according to claim 3 wherein the mechanical energy extracted from the flow control means is transmitted to mechanical energy converting means, said mechanical energy converting means including automatic means for determining the flow rate of the solution for comparing said flow rate to a selectively set value, and for changing said flow rate to said set value.

5. A method according to claim 3 wherein the flow control means is a gear pump.

6. A method according to claim 4 wherein the mechanical energy converting means is a generator.

7. A method according to claim 4 wherein the automatic means includes a comparator.

* * * * *